US006880895B1

(12) United States Patent
Brown et al.

(10) Patent No.: US 6,880,895 B1
(45) Date of Patent: Apr. 19, 2005

(54) VEHICLE BODY HAVING A TAILGATE SYSTEM OPERABLE IN A PLURALITY OF MODES

(75) Inventors: Eric C. Brown, Johnston, PA (US); Michael Bobak, Johnstown, PA (US); Timothy J. Simpson, Berlin, PA (US)

(73) Assignee: Somerset Welding & Steel, Inc., Somerset, PA (US)

( * ) Notice: Subject to any disclaimer, the term of this patent is extended or adjusted under 35 U.S.C. 154(b) by 0 days.

(21) Appl. No.: 10/387,691

(22) Filed: Mar. 13, 2003

Related U.S. Application Data

(60) Provisional application No. 60/364,686, filed on Mar. 15, 2002.

(51) Int. Cl.[7] .................................................. B60P 1/26
(52) U.S. Cl. ........................ 298/23 M; 296/51; 296/56
(58) Field of Search .............. 298/23 M, 23 S; 296/51, 296/56, 146.8, 146.11; 49/192

(56) References Cited

U.S. PATENT DOCUMENTS

| 1,207,266 | A | * | 12/1916 | Bartholomew ............... 296/51 |
| 1,531,212 | A | * | 3/1925 | Newman ...................... 296/51 |
| 2,806,735 | A | | 9/1957 | Smith |
| 3,567,274 | A | * | 3/1971 | Kaptur, Jr. et al. ........... 296/50 |
| 3,912,326 | A | | 10/1975 | Tass |
| 3,977,718 | A | | 8/1976 | Nordberg |
| 3,990,739 | A | | 11/1976 | Head |
| 4,307,541 | A | | 12/1981 | Farmer et al. |
| 4,665,649 | A | | 5/1987 | Hund, Jr. |
| 4,953,883 | A | | 9/1990 | Helie |
| 4,989,918 | A | * | 2/1991 | Biddy .................. 298/23 MD |
| 5,176,486 | A | | 1/1993 | Park |
| 5,685,594 | A | | 11/1997 | Harper |
| 6,302,491 | B1 | | 10/2001 | Anderson |
| 6,412,877 | B1 | * | 7/2002 | Faison ...................... 298/23 M |
| 6,742,826 | B1 | * | 6/2004 | Humphrey et al. ........... 296/51 |

* cited by examiner

Primary Examiner—Stephen Gordon
(74) Attorney, Agent, or Firm—King & Schickli, PLLC

(57) ABSTRACT

A tailgate system for a dump body of a vehicle capable of operation in a plurality of modes includes a tailgate pivotally connected to side walls along an upper tailgate end for operation in a first mode and pivotally connected to one of the side walls along a tailgate side for operation in a second mode. To convert the tailgate from the first to the second mode of operation, a ball and socket are engaged forming a pivot point around which the tailgate can rotate in the second mode.

17 Claims, 8 Drawing Sheets

VEHICLE BODY HAVING A TAILGATE SYSTEM OPERABLE IN A PLURALITY OF MODES

This application claims the benefit of U.S. Provisional Patent Application Ser. No. 60/364,686, filed Mar. 15, 2002.

TECHNICAL FIELD

The present invention relates generally to vehicle bodies, and more specifically, to a tailgate system for dump trucks and dump trailers or the like, capable of operation in a plurality of modes.

BACKGROUND OF THE INVENTION

Tailgates are generally known in combination with dump truck or dump trailer bodies (hereinafter referred to collectively as dump bodies). Conventional dump body tailgates are supported for pivotal movement during operation around upper pivot pins. More specifically, the tailgates rotate around upper pivot pins generally aligned with an upper end or top rail of the tailgate allowing a lower end of the tailgate to freely swing open as hauled materials are dumped from the dump body. This first mode of operation is referred to as a conventional dumping mode. In addition, it is known to disengage at least one of the pivot pins along the upper end of the tailgate to allow for rotation of the tailgate around one side thereof. This second mode of operation is referred to as a swing gate mode in which the tailgate of the dump body opens much like a typical barn door.

One such prior art dump body capable of operation in a conventional and a swing gate mode of operation is Manufactured by Bibeau Enterprises, Inc. In the conventional mode of operation, a tailgate pivots around upper pivot pins. To transition the Bibeau dump body to the swing gate mode of operation, an operator must manually disengage the upper pivot pins through operation of a ground control assembly shown in FIG. 1, and manually engage a ball and socket assembly shown in FIG. 2 to provide a pivot point around which the tailgate will rotate.

The ground control assembly, generally designated reference numeral 10, includes a lever 11 attached to an upwardly extending arm 12 which are externally positioned adjacent a rear corner post 13 of a dump body 14. The upwardly extending arm 12 in turn is attached to and controls a latching member 15. Operation of the lever 11 raises the upwardly extending arm 12 which in turn raises the latching member 15 causing the member to pivot and release one of the upper pivot pins 16. Although this ground control assembly 10 is adequate to perform its intended function of disengaging the upper pivot pin 16, the assembly stands off from the dump body sidewall making it prone to damage thru contact with other heavy equipment, hauled materials, and even tree limbs for example. In addition, the assembly is rather unsightly in contrast to the generally sleek lines of a dump body. Accordingly, a need is identified to protect such a ground control assembly from such contact type damage while maintaining the overall aesthetic appeal of the dump body.

As shown in FIG. 2, the ball and socket assembly 18 of the Bibeau dump body includes a ball 19 supported by a mounting head 20 and a socket 21. The socket 21, shown in phantom for clarity, is designed for manual rotation through an angle of approximately forty-five degrees for engaging and disengaging the ball. The mounting head 20 is welded to a lower end of the tailgate 22 adjacent a rear corner post 23 of the dump body 14. A mounting shank 24 supporting the ball extends through the mounting head 20 and a nut 25 secures the ball 19 to the mounting head for movement with the lower portion of the tailgate 22 when the socket is disengaged.

A pair of stub arms 26 welded to the rear corner post 23 of the dump body support the socket 21 for pivotal movement. The socket 21 is secured in engagement with the ball 19 by a collar 27 rotatably supported generally by the mounting head 20, and a locking pin 28 attached to the socket. In the swing gate mode, the collar 27 that is also shown in phantom for clarity is rotated into position directly beneath the ball 19. As the socket 21 is lowered into engagement with the ball 19, a shaft of the locking pin 28 extends through an aperture defined by the collar 27 and is secured in place with a cotter pin or the like. Once secured, upward rotation of the socket assembly is prevented by the collar contacting the ball.

Again, although this ball and socket assembly form a suitable pivot point around which the tailgate can pivot in the swing gate mode, the assembly includes numerous pieces making it cumbersome for a vehicle operator to manipulate, and making manufacturing difficult. Perhaps more importantly, the assembly is only manually operable from a position adjacent the rear of the dump body. Accordingly, a further need is identified for an assembly which is simpler to operate and manufacture, and preferably which is operable from alongside the vehicle or from a cab of the vehicle.

SUMMARY OF THE INVENTION

In accordance with a first aspect of the present invention, a body for a vehicle including a tailgate system capable of operation in a plurality of modes is disclosed. The body comprises a floor having a front wall and side walls attached thereto, and a tailgate having sides and upper and lower ends. The tailgate may be pivotally connected to the side walls along the upper tailgate end for operation in a first or conventional mode, and pivotally connected to one of the side walls along one of the tailgate sides for operation in a second or swing gate mode.

A socket may be attached to the tailgate for receiving and engaging a ball in the second mode of operation to form one of the pivotal connections along the tailgate side, and an actuator for moving the ball between a first disengaged position in the first mode of operation and a second engaged position in the second mode of operation may be provided. In one embodiment, the actuator may be a lever which may be locked in the second engaged position in the second mode of operation by a locking mechanism. The lever may extend through a corner post attached to the sidewalls adjacent the tailgate sides for actuating movement of at least one of the ball and socket. Alternatively, the actuator may be fluid operated. More specifically, a valve may be operatively connected between the actuator and a fluid reservoir for selectively moving the actuator between the first and second positions. A controller may be provided for selectively opening and closing the valve and may be positioned in a cab of the vehicle supporting the tailgate system or otherwise for convenient operation.

In accordance with a second aspect of the present invention, a latching member for engaging one of the pivot pins along the upper tailgate end in the first mode of operation and disengaging the pivot pin in the second mode of operation may be provided. The latching member is moved between engaged and disengaged positions by a latching member actuator. The latching member actuator may be fluid operated wherein a fluid reservoir and a valve operatively connected between the actuator and the reservoir are provided. Alternatively, the latching member actuator may include a handle connected to an arm extending between the handle and the latching member. In accordance with another aspect of the present invention, at least part of the actuator may be enclosed within a corner post of the vehicle to prevent contact type damage thereto while still maintaining the sleek lines and overall aesthetic appeal of the dump body.

As indicated above, the body supporting the tailgate system may be a dump truck including a cab or a dump trailer including a tractor for pulling the trailer and tailgate system. In accordance with another aspect of the present invention, a controller for selectively opening and closing the valve connected between the actuator and the reservoir may be positioned within the cab or tractor.

In an alternate embodiment of the present invention, a body comprises a floor having a front wall and side walls attached thereto, and a tailgate having sides and upper and lower ends. The tailgate may be pivotally connected to the side walls along the upper tailgate end for operation in a first or conventional mode, and pivotally connected to one of the side walls along one of the tailgate sides for operation in a second or swing gate mode. A socket or ball may be attached to the tailgate for receiving and engaging a ball or socket, respectively, in the second mode of operation to form one of the pivotal connections along the tailgate side, and an actuator for moving the ball or socket between a first disengaged position in the first mode of operation and a second engaged position in the second mode of operation may be provided.

In accordance with still another aspect of the present invention, a control means may be substantially positioned within a corner post attached to the sidewall adjacent the tailgate for selectively disengaging one of upper pivot pins in support of operation in the second mode. The control means may include a latching member for engaging one of the pivot pins along the upper tailgate end in the first mode of operation and disengaging the pivot pin in the second mode of operation. The latching member is moved between engaged and disengaged positions by a latching member actuator. The latching member actuator may be fluid operated wherein a fluid reservoir and a valve operatively connected between the actuator and the reservoir are provided. Alternatively, the latching member actuator may include a handle connected to an arm extending between the handle and the latching member. As indicated above, at least part of the actuator, handle, and arm may be enclosed within the vehicle corner post to prevent contact type damage thereto while still maintaining the sleek lines and overall aesthetic appeal of the dump body.

In accordance with a method of the present invention, a dump body tailgate may be converted from a first or conventional mode of operation wherein the tailgate is pivotally connected to side walls along an upper tailgate end to a second or swing gate mode of operation wherein the tailgate is pivotally connected to one of the side walls along one of the tailgate sides. The method may include the steps of moving a ball from a first disengaged position for operation in the first mode of operation to a second position in engagement with a socket attached to the tailgate, and disengaging a pivot pin along the upper tailgate end.

The method of converting the dump body tailgate, may further include actuating a lever attached to the ball and locking the lever in position once the ball and socket are engaged. The actuating step may further include opening a valve operatively connected between an actuator and a fluid reservoir to move the ball into engagement with the socket. In accordance with still another aspect of the method, the step of opening the valve may be performed from a cab of a vehicle supporting the dump body tailgate.

The disengaging step of the present invention may include transitioning a latching member from a first position in engagement with the pivot pin to a second disengaged position by contacting the latching member with an arm. As indicated above, the arm may be enclosed within a corner post of the dumb body for engaging and disengaging the latching member. In addition, the step of moving may include actuating a lever attached to the ball.

The following description shows and describes a preferred embodiment of this invention simply by way of illustration of one of the modes best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF THE INVENTION

Figure 3:
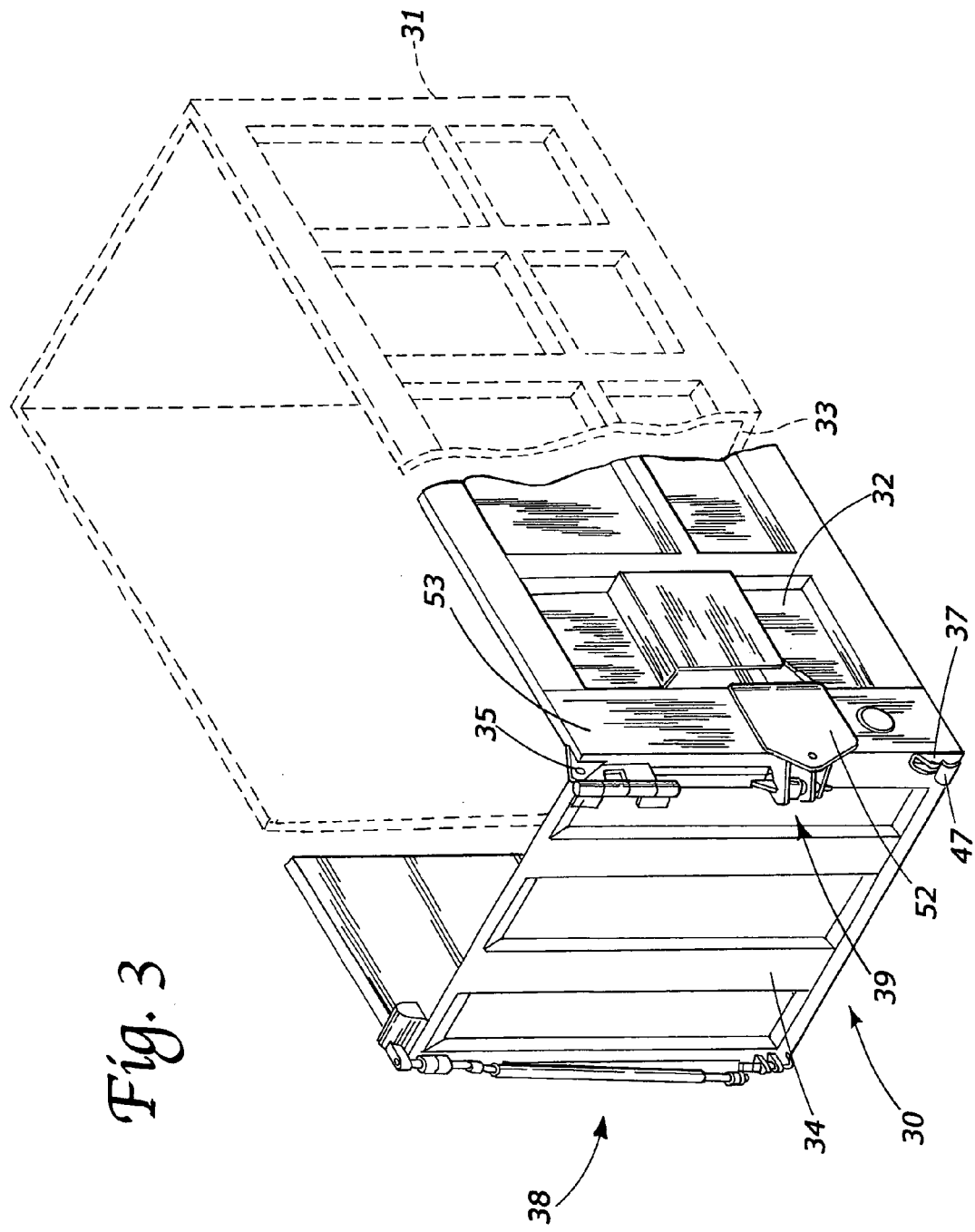
FIG. 3 is a perspective view of dump body including a tailgate system for operation in a plurality of modes.

With reference to the perspective view of FIG. 3, there is shown a dump body 30 for a vehicle, i.e, dump truck or dump trailer, including a tailgate that is capable of operation in a plurality of modes. The body 30 includes a front wall 31 and side walls 32 attached to a floor 33, and a tailgate 34. In a first or conventional mode of operation, the tailgate 34 rotates around upper pivot pins 35 generally aligned with an upper end of the tailgate, and in a second or swing gate mode of operation, the tailgate rotates around a side of the tailgate.

Figure 4:
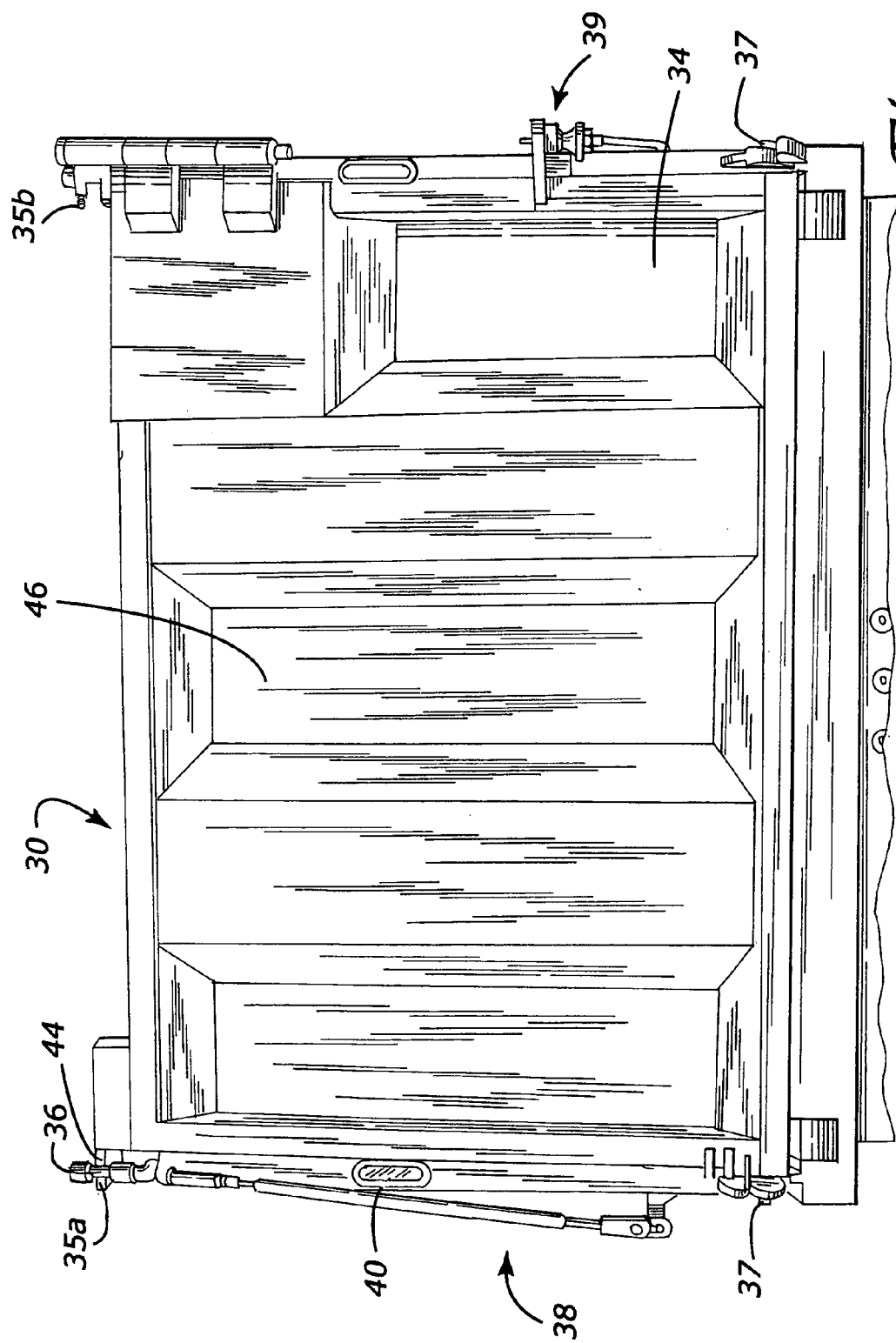
FIG. 4 is a perspective view of a body including a tailgate and ground control assembly used to disengage an upper pivot pin to allow operation of the tailgate in the second mode.

As best shown in FIG. 4, one of the upper pivot pins 35a in the present embodiment is temporarily engaged by a blocking bar 36 and the remaining upper pivot pin 35b is permanently engaged. In this manner, the tailgate 34 is allowed to pivot generally around its upper end during unloading in the conventional mode of operation. Lower pivot pins 37 are similarly provided that secure the lower end of the tailgate 34 together with the upper pivot pins 35 in a closed position during loading and travel of the dump body 30.

Figure 5:
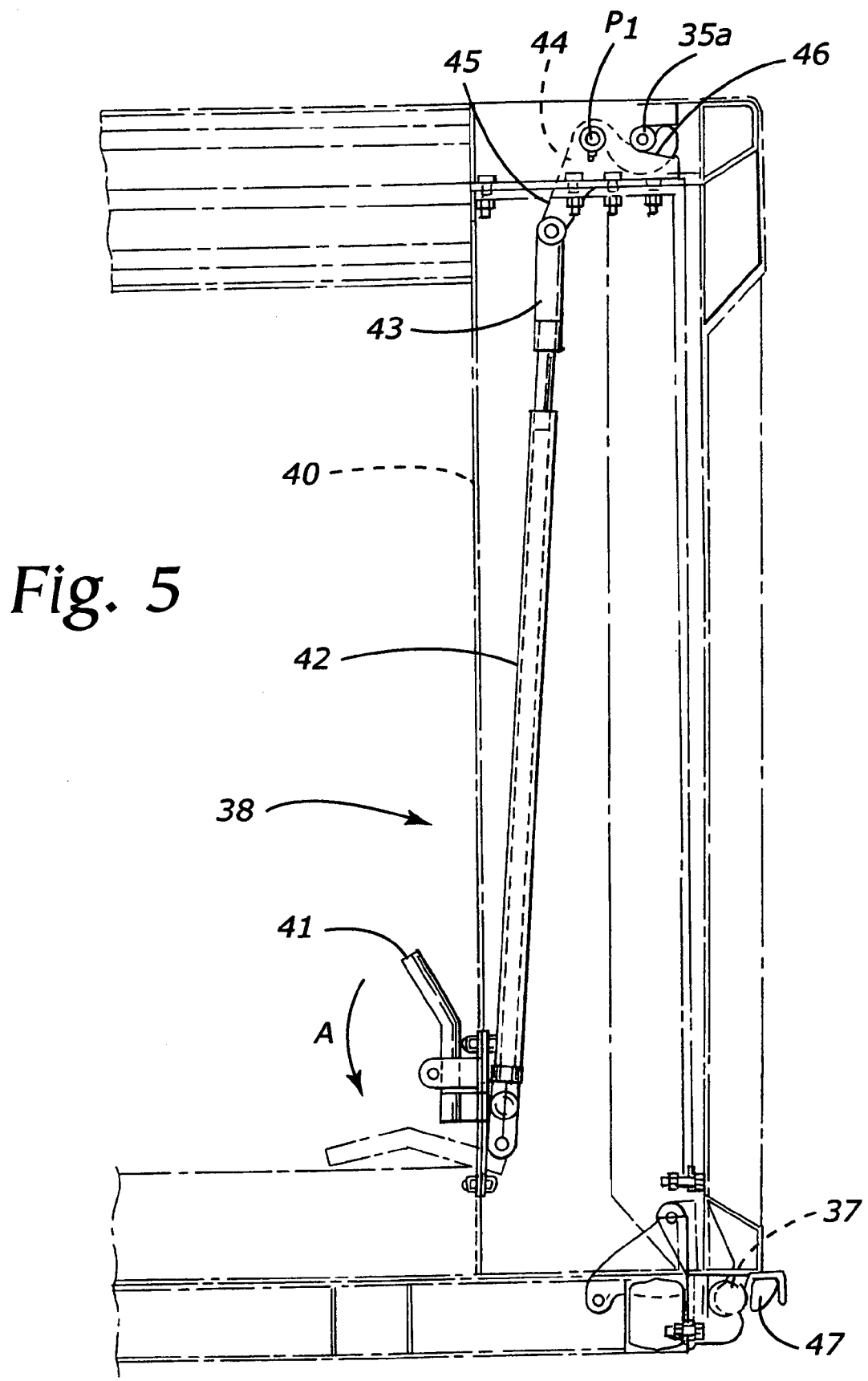
FIG. 5 is a cross-sectional view of an alternate ground control assembly positioned inside a rear corner post of the dump body.

In order to accommodate conversion between modes of operation, the dump body 30 of the present invention further includes a ground control assembly 38 and a ball and socket assembly 39. In accordance with the broad teaching of the present invention, the ground control assembly 38 may be positioned adjacent a rear corner post 40 of the dump body 30 as shown in FIG. 4 or substantially within the rear corner post as shown in FIG. 5. Since the ground control assembly 38 is substantially the same whether positioned adjacent to or within the rear corner post 40 of the dump body 30, only the ground control assembly positioned within the rear corner post will be described in detail at this time.

As best shown in FIG. 5, the ground control assembly 38 generally includes a hand lever 41 linked to an upwardly extending arm 42. The upwardly extending arm 42 is attached at an upper end 43 to a latching member 44 for securing one of the upper pivot pins 35a in position during operation in the conventional mode, or during loading and travel of the dump body. Operation of the lever 41 (shown by action arrow A) raises the upwardly extending arm 42 which in turn raises a lower portion of the latching member 45 causing the member to pivot about pivot point $P_1$. The upward movement of the lower portion of the latching member 45 and pivotal movement lower a blocking bar 46 of the latching member thus releasing one of the upper pivot pins 35a and freeing one side of the tailgate 34 to swing open.

Referring back to FIGS. 3 and 4, lower pivot pins 37 extend from each side of the lower end of the tailgate 34 which are similarly engaged by lower latching members 47 during loading and travel of the dump body 30. During operation in either the conventional or swing gate mode, the lower pivot pins 37 are disengaged through operation of an air tailgate switch (not shown) as is well known in the art. The air tailgate or V8S switch is typically positioned in a cab of the vehicle. When activated, air pressure from an air tank positioned on a chassis of the dump body 30 is applied to a pneumatic cylinder causing the cylinder to stoke outwardly. The outward stroke and movement of the linkage operate to move or pivot the latching members 47 which disengage the latching members from the pivot pins 37. The arrangement of the latching members 47 and pivot pins 37 is best illustrated in FIG. 5. Although a similar pneumatic cylinder and linkage assembly are shown in FIG. 6, the air tailgate switch, pneumatic cylinder and linkage assembly arrangement which actuate the latching members 47 are well known in the art and are not shown herein.

Figure 1:
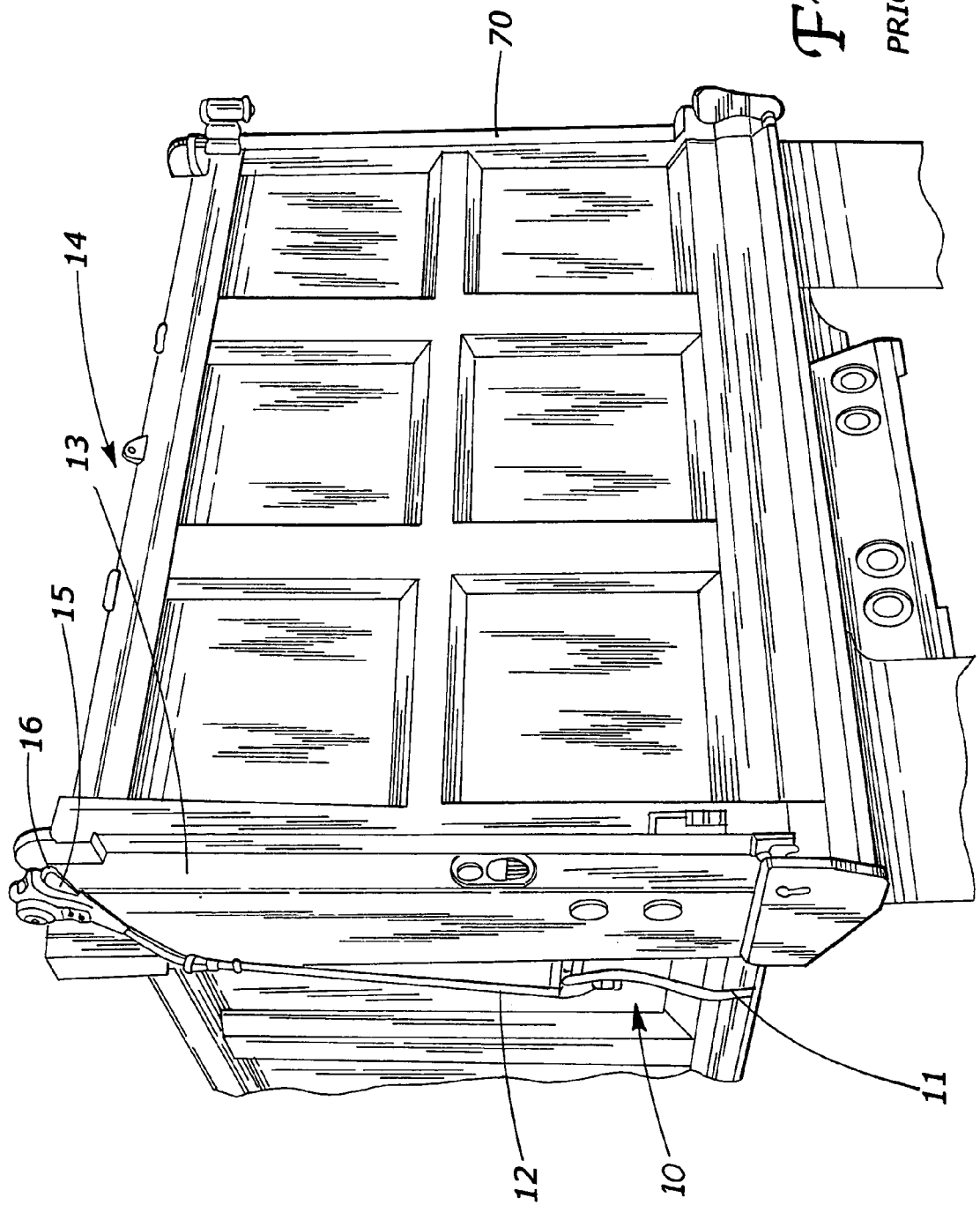
FIG. 1 is a partial side elevational view of a ground control mechanism for releasing a pivot pin of a prior art dump body.
Figure 2:
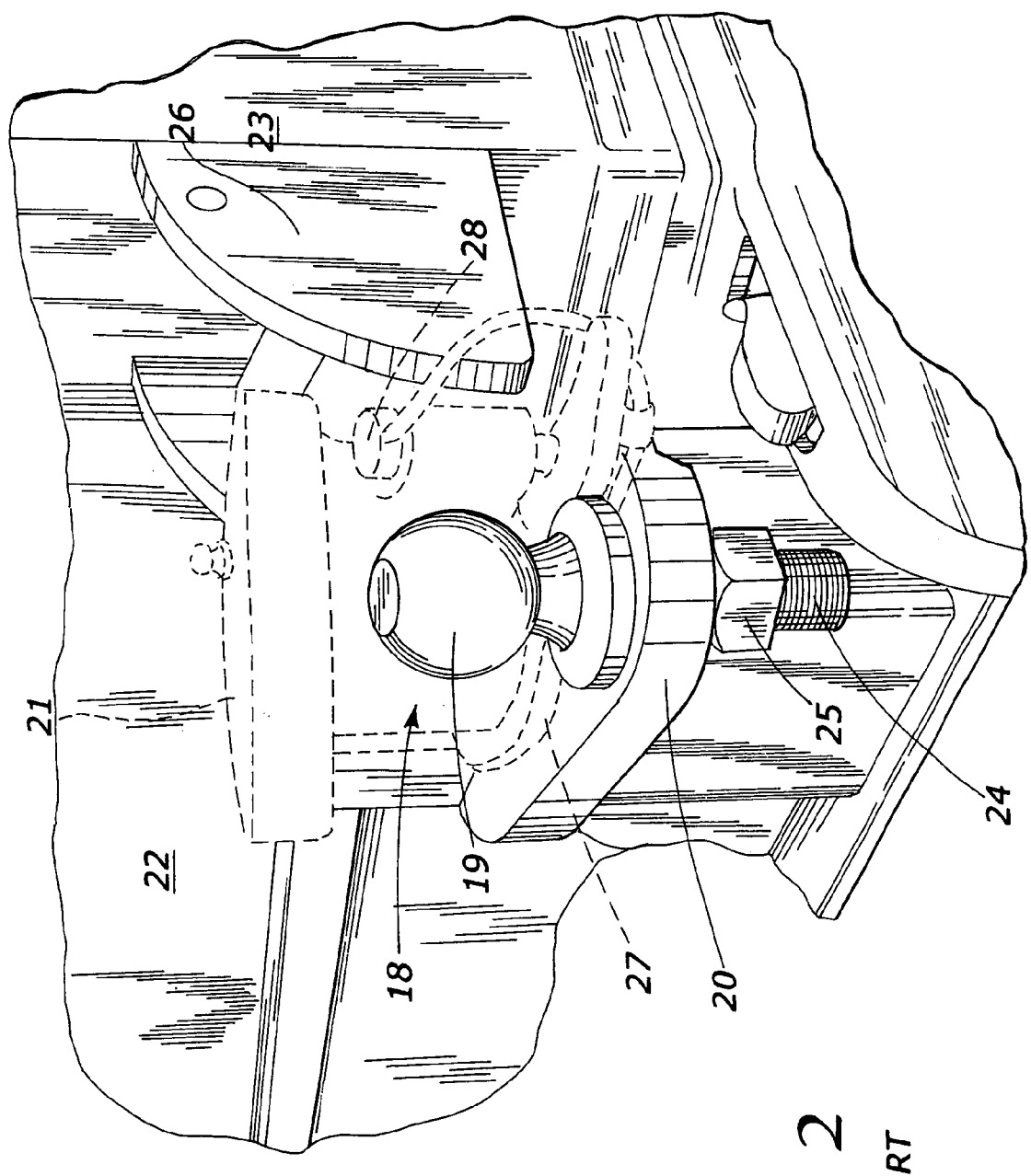
FIG. 2 is a perspective view of a ball and socket assembly for creating a pivot point of a prior art dump body.
Figure 6:
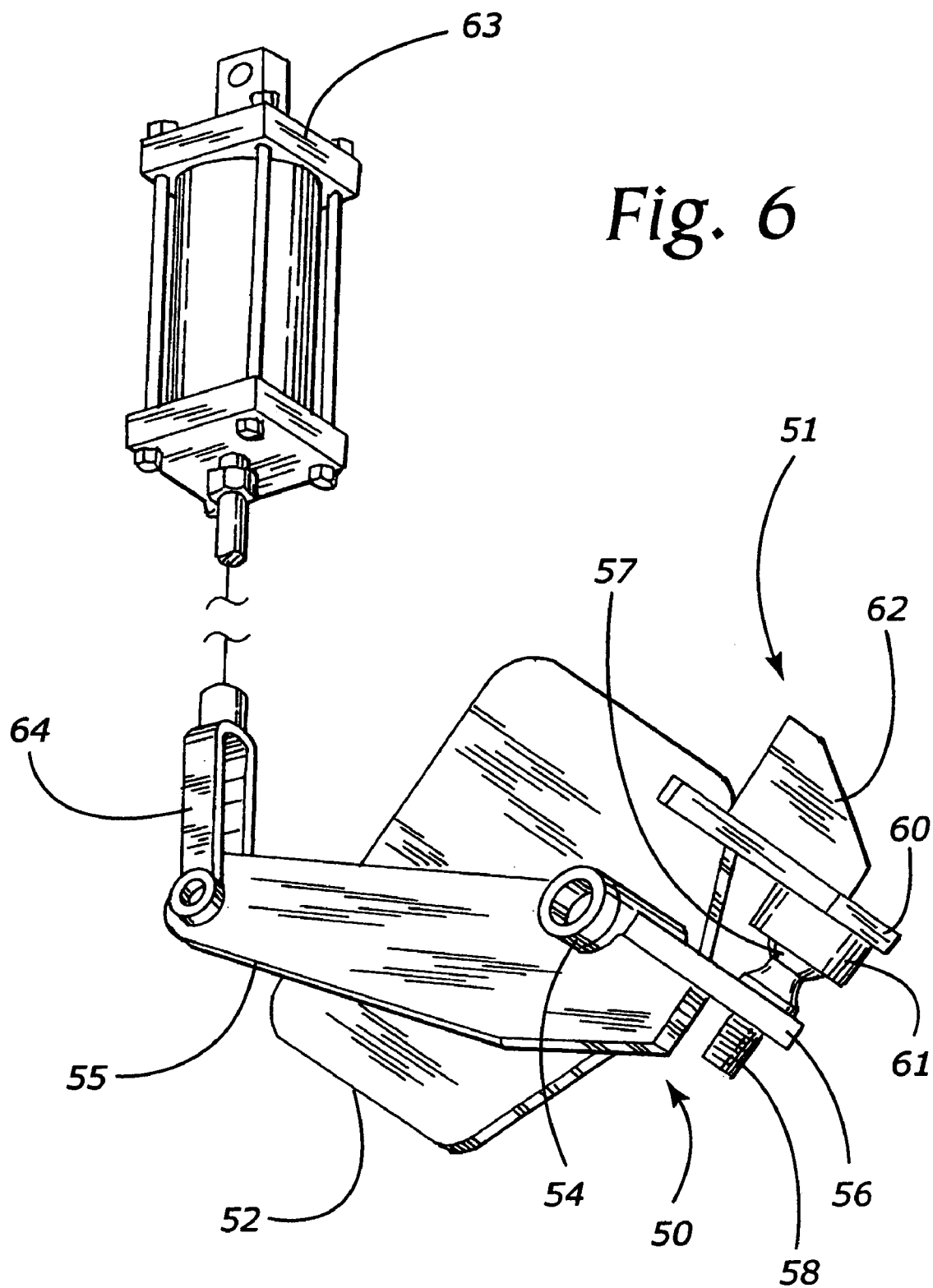
FIG. 6 is a perspective view of a ball and socket assembly of the body.

As shown in FIG. 1 and perhaps best shown in the perspective view of FIG. 6, a ball and socket assembly 39 of the dump body 30 includes a ball assembly 50 and a socket assembly 51. The ball assembly 50 includes a pivot bracket 52 welded to a rear corner post 53 of the dump body 30 (see FIG. 1). A bushing 54 is welded to the bracket 52 and provides a pivot point for lift arm 55. A mounting plate 56 is formed on or otherwise attached to the lift arm 55 and supports a ball 57 for movement between a disengaged position in the conventional mode of operation and an engaged position in the swing gate mode of operation. A mounting shank 58 supporting the ball 57 extends through the mounting plate 56 and a nut (not shown) secures the ball thereto.

The mounting plate 56, the mounting shank 58, ball 57 and nut are supported by the dump body 30 and do not move with the lower portion of the tailgate 34 but independently about bushing 54. As best shown in FIG. 1, the socket assembly 51 is mounted to and moves with the tailgate 34. Referring back to FIG. 6, the socket assembly 51 includes a hitch plate 60 which supports a socket 61. A gusset 62 in the present embodiment provides additional strength to the socket assembly 51. It should be understood that the ball assembly and socket assembly may be mounted to the tailgate 34 and dump body 30 and actuated in any known manner in accordance with the broad teaching of the present invention.

In the present embodiment, for example, the ball assembly 50 is attached to a pneumatic cylinder 63 mounted to the sidewall 32 of the dump body 30. The pneumatic cylinder 63 is attached to the lift arm 55 of ball assembly 50 via an appropriate linkage (not shown) and clevis 64. During unloading in the swing gate mode of operation, the lift arm 55 and ball 57 are raised into engagement with socket 61 through operation of the pneumatic cylinder 63. A second air switch, or V8S switch, is positioned in the cab of the dump truck or dump trailer in the present embodiment for activating the cylinder 63. When activated, air pressure from an air tank (not shown) positioned on the chassis of the dump body 30, for example, is applied to the pneumatic cylinder 63 causing the cylinder to stroke outwardly. The outward stroke and movement of the linkage and clevis 64 operate to move or pivot the lifting arm 55 about bushing 54 which raises the ball 57 into engagement with the socket assembly 51 and more specifically, the socket 61. The ball 57 is secured in the socket 61 until the air switch is deactivated by the operator in the cab.

Figure 7:
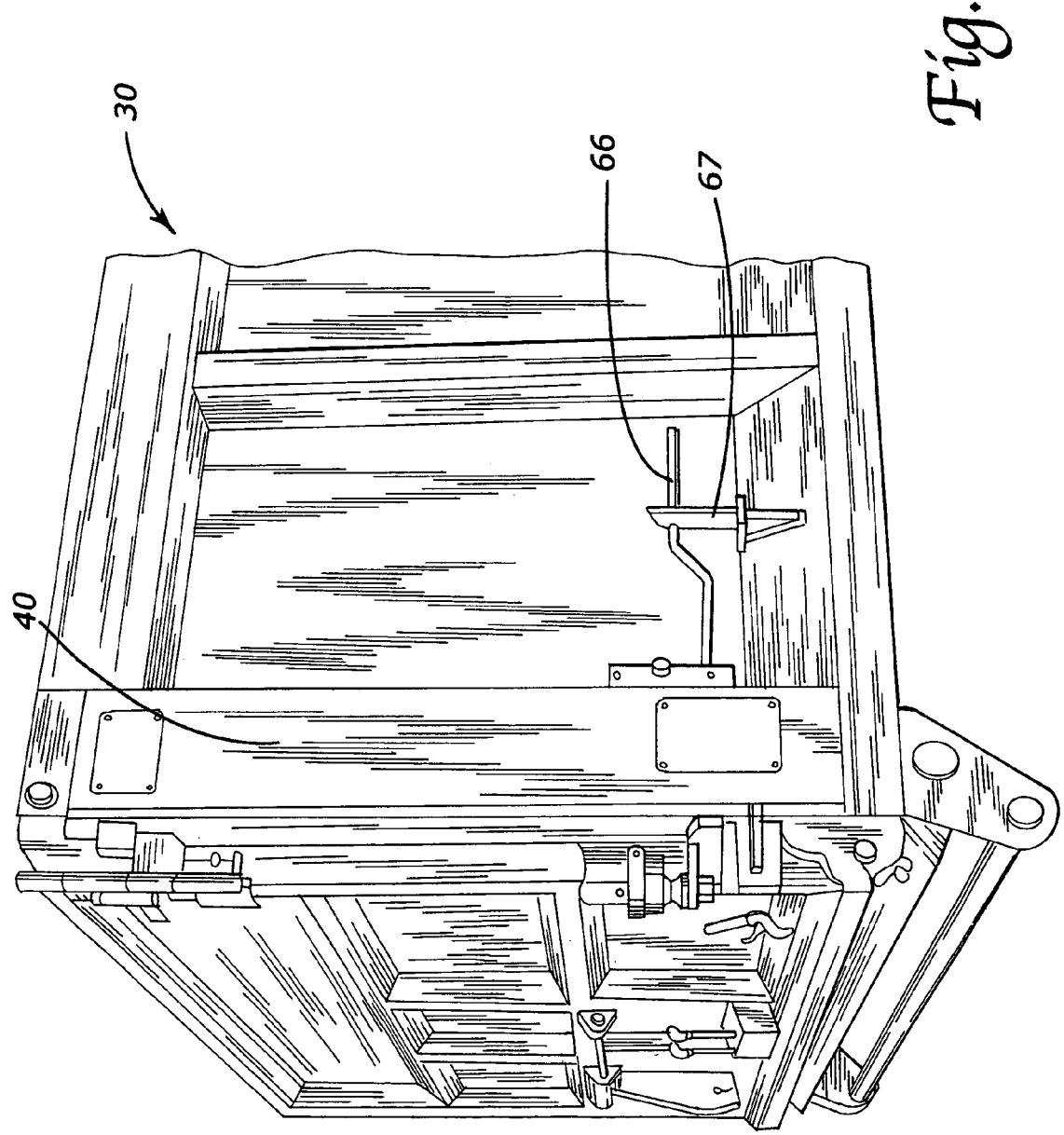
FIG. 7 is a perspective view of a rear portion of a dump body showing a manual lever to move or pivot a lifting arm about a bushing in order to raise a ball into engagement with a socket for swing mode operation.

In an alternate embodiment of the present invention shown in FIG. 7, a lever 66 may be used to manually move or pivot the lifting arm 55 about bushing 54. Movement of the lever 66 similarly raises the ball 57 into engagement with the socket 61. In the present embodiment, the lever 66 is mounted just forward of the rear corner post 40 along a lower portion of the sidewall 32 of the dump body 30. Of course, other positions for the lever may be used in accordance with the present invention. In addition, a locking mechanism 67 is utilized in the present embodiment to prevent accidental operation of the lever 66.

Figure 8:
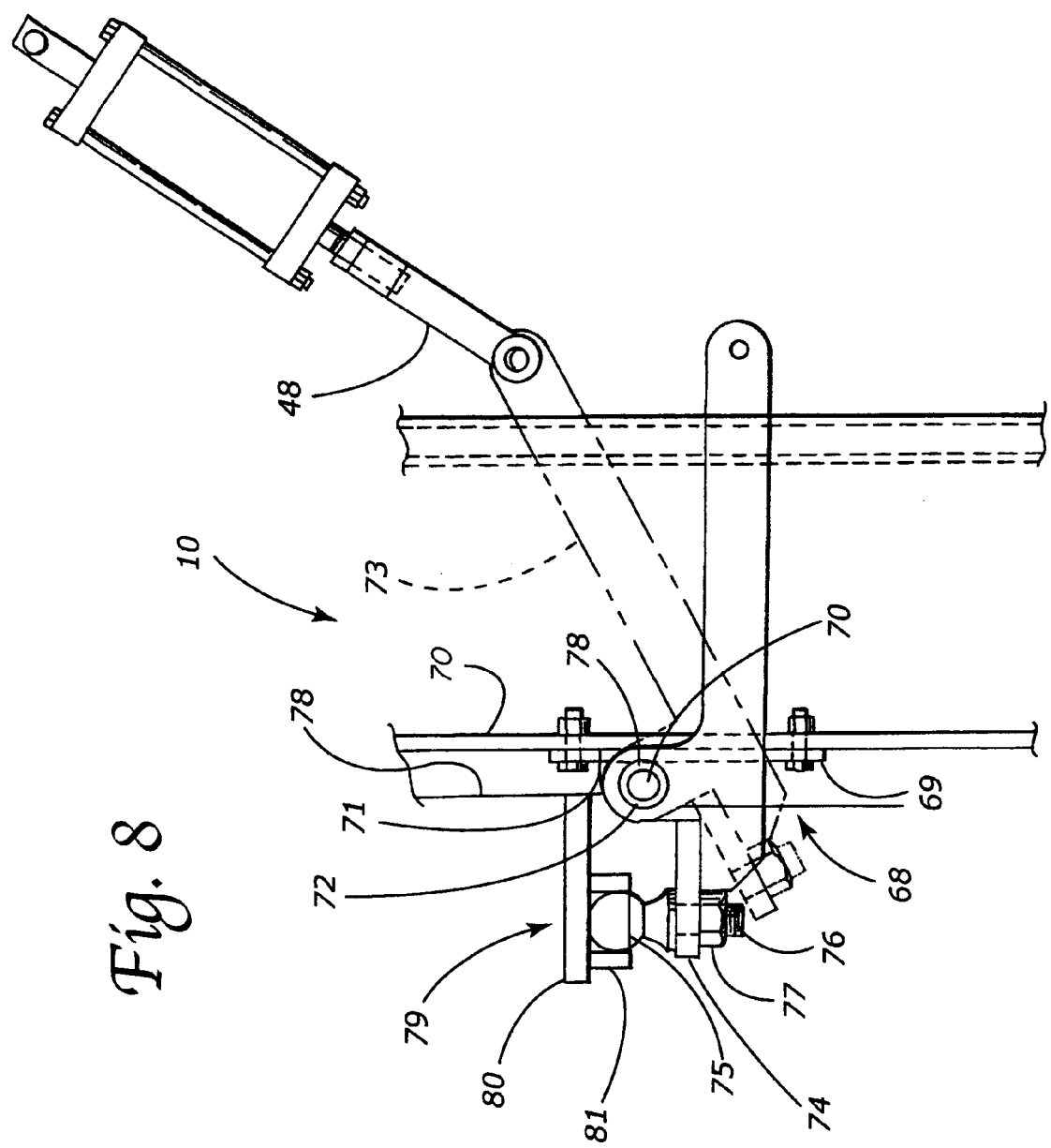
FIG. 8 is a cross-sectional side view showing movement of an alternate ball assembly between a disengaged position for operation in a conventional mode, and an engaged position for operation in a swing mode.

In another alternate embodiment of the present invention shown in FIG. 8, perhaps a simpler ball assembly 68 is described. The ball assembly 68 includes a mounting plate 69 welded to a rear corner post 70 of a dump body. The mounting plate 69 includes a pair of ears 71 which support a bushing 72. The bushing 72 provides a pivot point for lift arm 73. A mounting plate 74 is formed on or otherwise attached to the lift arm 73 and supports a ball 75 for movement between a disengaged position (shown in phantom lines) in the conventional mode of operation and an engaged position (shown in solid lines) in the swing gate mode of operation. A mounting shank 76 supporting the ball 75 extends through the mounting plate 74 and a nut 77 secures the ball thereto. As in the earlier described embodiment, the mounting plate 74, the mounting shank 76, ball 75 and nut 77 are all supported by the dump body sidewall and do not move with the lower portion of the tailgate 78 but independently about bushing 72. The socket assembly 79, on the other hand, includes a hitch plate 80 which supports a socket 81 and is mounted to and moves with the tailgate 78. This alternate ball assembly 68 may also be manually operated utilizing a lever or operated utilizing a pneumatic cylinder or the like as are described in detail above.

To transition from the conventional mode of operation to the swing mode of operation, the ball and socket must be engaged. In one embodiment of the present invention, the operator activates a pneumatic cylinder from the cab of the dump body forcing the ball upwards into engagement with the socket. Once engaged, the tailgate may be opened in the swing mode by releasing the lower pivot points of the tailgate through activation of another pneumatic cylinder from the cab of the dump body or manually, and finally by disengaging an upper pivot pin utilizing the ground control assembly.

The foregoing description of the present embodiments of the invention have been presented for purposes of illustration and description. It is not intended to be exhaustive or to limit the invention to the precise form disclosed. Obvious modifications or variations are possible in light of the above teachings. For example, the ball assembly 50 may be mounted to and move with the tailgate 34. In such an alternate embodiment, the socket assembly 51 is supported by lift arm 55 for pivotal movement about bushing 54 between a disengaged position in the conventional mode of operation and an engaged position in the swing gate mode of operation.

The present embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A body for a vehicle having a tailgate system operable in a plurality of modes comprising:
   a floor having a front wall and side walls attached thereto;
   a tailgate having sides and upper and lower ends, the tailgate being pivotally connected to said side walls along said upper tailgate end for operation in a first mode and pivotally connected to one of said side walls along one of said tailgate sides for operation in a second mode;
   a socket attached to said tailgate for receiving a ball in said second mode of operation, said ball and socket forming one of said pivotal connections along said tailgate side; and
   an actuator for moving said ball between a first disengaged position in said first mode of operation and a second engaged position in said second mode of operation.

2. The body of claim 1, wherein said actuator is a lever; and
   a locking mechanism for locking said lever and said ball in said second engaged position in said second mode of operation.

3. The body of claim 2, further comprising corner posts attached to said sidewalls adjacent said tailgate sides; and wherein said lever extends through one of said corner posts.

4. The body of claim 1, wherein said actuator is fluid operated; and
   a fluid reservoir and a valve operatively connected between said actuator and said reservoir for selectively moving said actuator between said first and second positions.

5. The body of claim 4, further comprising a controller for selectively opening and closing said valve.

6. The body of claim 5, wherein the vehicle is a dump truck including a cab and a chassis for supporting the tailgate system; and
   wherein said controller is positioned in said cab.

7. The body of claim 5, wherein the vehicle is a dump trailer including a tractor for pulling a chassis supporting the tailgate system; and
   wherein said controller is positioned in a cab of said tractor.

8. The body of claim 1, further comprising corner posts attached to said sidewalls adjacent said tailgate sides;
   a latching member for engaging a pivot pin along said upper tailgate end in said first mode of operation and disengaging said pivot pin in said second mode of operation;
   a handle; and
   an arm connected to and extending between said handle and said latching member, said arm being enclosed within one of said corner posts for moving said latching member.

9. The body of claim 8, wherein said actuator is fluid operated; and
   a fluid reservoir and a valve operatively connected between said actuator and said reservoir for selectively moving said actuator between said first and second positions.

10. The body of claim 1, further comprising corner posts attached to said sidewalls adjacent said tailgate sides;
    a latching member for engaging a pivot pin along said upper tailgate end in said first mode of operation; and
    a latching member actuator for moving said latching member.

11. The body of claim 10, wherein said latching member actuator is enclosed within one of said corner posts.

12. A body for a vehicle having a tailgate system operable in a plurality of modes comprising:
    a floor having a front wall and side walls attached thereto;
    a tailgate having sides and upper and lower ends, said tailgate being pivotally connected to said side walls along said upper tailgate end for operation in a first mode and pivotally connected to one of said side walls along one of said tailgate sides for operation in a second mode;
    corner posts attached to said sidewalls adjacent said tailgate sides;
    control means substantially positioned within one of said corner posts for selectively engaging at least one upper pivot pin in support of operation in said first mode; and
    a ball and socket moveable between a first disengaged position in said first mode of operation and a second engaged position in said second mode of operation.

13. The body of claim 12, wherein said control means includes a latching member for engaging said at least one upper pivot pin along said upper tailgate end in said first mode of operation and disengaging said pivot pin in said second mode of operation.

14. The body of claim 13, wherein said control means further includes a handle and an arm connected to and extending between said handle and said latching member, said arm being enclosed within said one of said corner posts for moving said latching member.

15. The body of claim 14, wherein said socket is attached to said tailgate for receiving said ball in said second mode of operation, said ball and socket forming one of said pivotal connections along said tailgate side; and
- an actuator for moving said ball between said first disengaged position in said first mode of operation and said second engaged position in said second mode of operation.

16. The body of claim 13, wherein said control means further includes an actuator connected to said latching member and at least partially enclosed within said one of said corner posts for moving said latching member.

17. A body for a vehicle having a tailgate system operable in a plurality of modes comprising:

- a floor having a front wall and side walls attached thereto;
- a tailgate having sides and upper and lower ends, the tailgate being pivotally connected to said side walls along said upper tailgate end for operation in a first mode and pivotally connected to one of said side walls along one of said tailgate sides for operation in a second mode;
- corner posts attached to said sidewalls adjacent said tailgate sides;
- a ball and socket forming one of said pivotal connections along said tailgate side in said second mode of operation; and
- an actuator extending through one of said corner posts for moving at least one of said ball and said socket between a first disengaged position in said first mode of operation and a second engaged position in said second mode of operation.

* * * * *